United States Patent Office 2,803,311
Patented Aug. 20, 1957

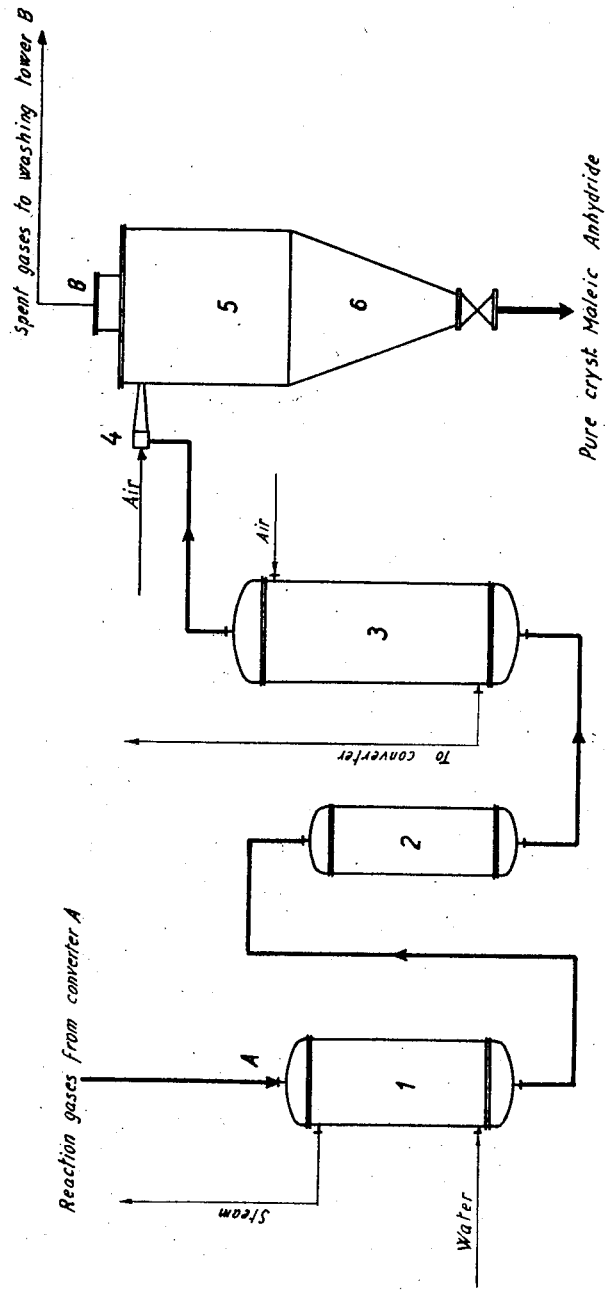

2,803,311

PROCESS FOR SEPARATING PURE, CRYSTALLINE MALEIC ANHYDRIDE DIRECTLY FROM GASEOUS MIXTURES CONTAINING SAME

Ettore Guidi, Milan, Italy, assignor to Montecatini, Società Generale per l'Industria Mineraria e Chimica, a corporation of Italy Application April 18, 1956, Serial No. 579,051

Claims priority, application Italy April 20, 1955

6 Claims. (Cl. 183—114.2)

This invention relates to a process for separating pure, crystalline maleic anhydride directly from crude, gaseous mixtures containing the same.

Maleic anhydride is obtained in industrial practice as the result of a partial oxidation of suitable organic materials, such as benzene, by means of air in excess over the stoichiometric amount. The crude gaseous mixture, emerging as hot flue gas from devices adapted for this purpose, contains newly formed maleic anhydride, small amounts of starting material in vapor form, excessive unreacted air and nitrogen, carbon dioxide, carbon oxide, water in form of steam originating partly from the moisture of the air used for oxidation and partly formed as one of the reaction products and, finally, small amounts of quinone, hydroquinone and heavier products in form of dark-colored pitches.

Upon cooling such a gaseous mixture directly by means of surface heat exchangers to a temperature lower than the temperature at which the vapor phase of maleic anhydride is in equilibrium with the liquid and solid phases thereof, and to a temperature higher than the dew point of the steam contained in the gas mixture, a condensation takes place which, passing through a succession of equilibria, results, in a mixture of maleic anhydride and maleic acid, whereby the percentage of the latter in the mixture increases the more this fractional condensation is being pushed to the limit.

Apparently, one condition of preventing the formation of maleic acid would be to operate in such a manner so as to avoid reaching the physicochemical equilibrium of the water-maleic anhydride system; in other words, to attain such conditions within the gaseous mass that a stable liquid phase is absent and the maleic anhydride passes directly from the vapor phase into the solid phase, while the moisture present is maintained in vapor form.

I have discovered the manner of practically applying the aforesaid principle by means of the following two operations:

(a) The gaseous mixture containing maleic anhydride vapor and steam is suddenly cooled from a temperature near to but higher than that at which anhydride vapor, steam and liquid anhydride are in equilibrum, while, at the same time, provisions are made for cooling further until a lower temperature limit is reached, whereby the aforesaid phase equilibrium is passed and the formation of acid is prevented.

The adjustment to the afore-mentioned temperature close to but slightly higher than the temperature at which a state of equilibrium exists between vaporous anhydride, steam and liquid anhydride is readily carried out by setting this temperature equal to the temperature corresponding to the sum of partial pressures of anhydride vapors and of steam present in the gaseous mixture.

(b) Simultaneous with the cooling, the gaseous mixture is diluted with an inert gas, such as air, so as to bring the maleic anhydride partial pressure to a value equal or lower than that corresponding to the triple point of the anhydride phase diagram, with an upper limit, however, of about 3 mm./Hg; under these conditions, maleic anhydride exists only either in the vapor phase or in the solid phase.

Therefore, by cooling the gases below 52.8° C., i. e. below the melting point of maleic anhydride, the vapors thereof condense and result in the pure, crystalline compound. The lower limit of this cooling of the gaseous mixture is a temperature corresponding to the dew point of the steam contained in the diluted gases.

In practice, these steps are performed by cooling, by means of surface heat exchangers, the hot gaseous mixture containing maleic anhydride vapors and steam, until the above-specified temperature is reached. Then, a colder inert gas is injected so that the gaseous mixture is simultaneously cooled and diluted.

If the temperature of the inert gas is thereby such so as to bring the temperature of the entire mass of diluted gases to a value approaching the aforementioned lower limit, the anhydride will condense at the highest yield without any further action. If, in contrast thereto, the temperature of the inert gas is such that the temperature of the entire gas mass is considerably above this limit, the gaseous mass will have to be cooled by means of thermal exchange with the walls of the sublimation chamber, wherein the maleic anhydride is deposited in crystalline form.

While the amount of inert diluting gas is determined by the requirements of (b), the temperature thereof is consequently not of primary consideration.

Therefore, the operation characterizing the process of this invention is the injection of an inert, cold gas, mixing this gas suddenly with the gases to be treated while cooling and diluting them in order to attain certain temperature and concentration conditions for the condensable materials present in the gaseous mass whereby the maleic anhydride condenses, while the moisture present remains in form of steam and does not interfere with the separation of solid anhydride.

This process may be applied for separating maleic anhydride from any gaseous mixture containing maleic anhydride and steam, wherein the anhydride may be present in any concentration higher than 0.065% by volume; whereby the actual separation yields increase from 30 to 90% with anhydride concentrations increasing from the aforesaid lowest value to 0.4% by volume, provided that the steam concentration in the dilute gaseous mixture does not exceed 3% by volume.

It is particularly noteworthy that, when treating oxidation gases of suitable materials in this manner, the separation conditions of this process do not interfere with the catalytic oxidation. Consequently, the ratio between oxidizing air on the one hand and hydrocarbon fed into the reactor on the other hand may be elected at will.

The amount of anhydride which theoretically separates is 95% of the anhydride contained in the gaseous mixture, provided that the anhydride concentration is between 0.5 and 0.9% and the final condensation temperature varies from 20 to 23° C.

The separation yields actually attainable by the process of this invention vary from 91 to 93%.

The maleic anhydride obtained by this process is crystalline and has a titrated purity higher than 99%. The melting point is 52–53° C.

Moreover, even where benzene is used in the oxidation process, entirely white, crystalline maleic anhydride of the aforesaid characteristics can be obtained if the gases are first purified by filtration through an adsorbing material.

In conjunction with the accompanying drawing, a detailed description is given of the operations characterizing the process, for example in conjunction with the hot gases of a benzene oxidation reaction:

The gases leave the converter A at a temperature ranging from 400 to 460° C. These gases are partially cooled to 200° C., whereby the liberated heat of the gases is recovered by means of a multiple pipe heat exchanger 1 which acts as a steam generator. The gases leaving the heat exchanger are purified by means of passing them through a filter 2, containing adsorbing materials, such as activated charcoal, activated alumina, silica gel, etc. Both the operating temperature of the filter and the time of stay of the gases within the filter must be such that most of the impurities that could contaminate the condensated product are eliminated, while, at the same time, a permanent adsorption of maleic anhydride is avoided. This is attained, for example, by causing the gases to enter the filter at a temperature of about 300° C., to remain for 1–1.5 sec. in contact with the activated material and to leave the filter at a temperature of 200–110° C.

The gases pass then into a second heat exchanger 3, where they are further cooled. Most conveniently, the temperature of the gases leaving this heat exchanger is equal to or lower than the temperature specified in (a) but in no case should it be lower than the vapor-liquid phase equilibrium temperature of the maleic anhydride contained in the gases.

This temperature is, therefore, determined by the converter yield, by the feeding ratio between air and benzene, by the moisture content of the air fed into the reactor, and by the phase diagram of the anhydride. It varies from 60 to 90° C.

The gases leaving this heat exchanger are diluted with additional colder gases that are inert against the anhydride, such as nitrogen, carbon dioxide and, particularly, atmospheric air.

In order to attain an appropriate mixing of the gases with, say, air, a device similar to an ejector is used wherein the diluting air is the carrying medium.

The dilution and subsequent condensation can be carried out in several different ways:

*Method 1.*—The gases are diluted by mixing them in an ejector 4, directly connected with the condensation chamber 5, or placed inside thereof, with air of atmospheric temperature and moisture, in such an amount that the partial pressure of maleic anhydride in the gaseous mixture, comprising conversion gas and diluting air, is about 2.4 mm./Hg, with an upper limit of about 3 mm./Hg. In this manner, it is possible to obtain a rapid cooling of the gases which, within the condensation chamber, are further cooled by thermal exchange with the walls of the chamber whereby the latter is cooled by means of an outer jacket and a fluid refrigerant flowing within said walls and said outer jacket.

The condensation chamber consists preferably of a cylindrical body 5 of sufficient volume, provided with a cone-shaped bottom 6. The gases remain therein from 10 to 60 seconds.

The gases are cooled within the condensation chamber until they reach a temperature slightly higher than the dew point of the steam contained in the gases. Long, crystalline needles of maleic anhydride are formed, which are removed from the walls by means of a scraper, to drop into the bottom from where they are discharged.

*Method 2.*—The gases are diluted by mixing them in an ejector, such as described in Method 1, with cooled, atmospheric air, in such an amount that the partial pressure of maleic anhydride in the gaseous mixture is about 2.24 mm./Hg, with an upper limit of about 3 mm./Hg. The temperature of the diluting air must be such as to bring the entire gaseous mixture, after dilution, to the final condensation temperature, allowing for the heat set free by the anhydride passing from the gaseous into the solid phase. Under no circumstances should the temperature of the diluted, cooled gas mixture reach a point below the dew point of the steam contained in the gases. When operating in this manner, the liquefying point of maleic anhydride is passed, but at such conditions of instability that the gases, already cold, are oversaturated when they enter the condensation chamber so that the anhydride precipitates in form of crystals.

Emerging from the condensation chamber, the gases enter the washing tower B where they are washed with water in order to absorb any of the maleic anhydride that previously escaped. In this manner, a concentrated solution of maleic acid is obtained, which is conveniently converted into fumaric acid.

The following examples are furnished to illustrate the present invention, without intention to limit thereby the scope of the appended claims.

*Example 1*

The converter is fed with a mixture of air and benzene, at a ratio of 28.5 kg. of air per 1 kg. of benzene. The feeding temperature of atmospheric air is 10° C., the moisture content 65%. 53 kg. of maleic anhydride are obtained from every 100 kg. of benzene. The gases leave the reactor at 350° C., enter into a heat exchanger at this temperature and leave it at 200° C.; at this temperature, they enter a filter, wherefrom they emerge at 190° C.; at this temperature they enter another heat exchanger, from which they emerge at 115° C. After mixing the gases with atmospheric air at a ratio of 30 kg. of air per 1 kg. of fed benzene, they enter the condensation chamber where they are cooled to 20° C.

White maleic anhydride is obtained, having a purity of 99.5%. The separation yield is 97%.

*Example 2*

The converter is fed with a mixture of air and benzene at a ratio of 32 kg. of air per 1 kg. of benzene. The feeding temperature of atmospheric air is 5° C., the moisture content 70%. 57.5 kg. of maleic anhydride are obtained from every 100 kg. of benzene. The gases leaving the converter at 430° C. are passed into a heat exchanger, wherein they are cooled to 200° C. From the exchanger they pass through a filter, from which they emerge at the same temperature (200° C.). They enter, then, into a second heat exchanger, where they are cooled to 110° C. They are mixed with 30 kg. of atmospheric air per 1 kg. of benzene and are passed, diluted in this manner, in the condensation chamber, wherein they are cooled to 20° C. White maleic anhydride is obtained, having a purity of 99.4%. The separation yield is 93.5%.

*Example 3*

The converter is fed with a mixture of air and benzene at a ratio of 32.8 kg. of air per 1 kg. of benzene. The temperature of the atmospheric air is 25° C., the moisture content 50%. 46 kg. of maleic anhydride are obtained from 100 kg. of benzene. The gases, emerging from the converter at 430° C., are cooled to 200° C., passed through a filter which they leave at 190° C. and, by means of a second heat exchanger, are cooled to 75° C.

The gases are then mixed with 40 kg. of air per 1 kg. of benzene, the air being cooled to —10° C. Upon dilution, the gases immediately reach a temperature of 31° C. White maleic anhydride is obtained which has a purity of 99.7%. The theoretical yield of separation is 84.5%; the actual yield 77%. The relatively low yield is caused by the low anhydride concentration in the oxidation gases.

*Example 4*

A mixture of air, 0.87% by vol. of maleic anhydride vapor and 3.5% of steam, is heated to 200° C., and then cooled to 76° C. in a heat exchanger.

The mixture is diluted with air of —18° C., at a ratio of 2 Nm.$^3$ for every Nm.$^3$ of the mixture. The temperature of the gaseous mass after dilution is 24° C. 99.5% maleic anhydride is obtained. Theoretical separation yield 97%, actual yield 92.5%.

Broadly stated, in order to recover crystalline maleic anhydride at an actual separation yield of 90% and more, the gaseous oxidation mixture should have a maleic anhydride concentration of not less than 0.5% by volume and a water vapor concentration of not appreciably more than 2.5% by volume, and the pressure in the condensation chamber should be near to atmospheric pressure.

I claim:

1. A process for the direct separation of pure, crystalline maleic anhydride from a gaseous mixture obtained upon partial oxidation of benzene and like organic compounds and consisting of maleic anhydride, water vapors and by-products of the oxidation, said process comprising a first cooling of said gaseous mixture to a temperature not lower than that corresponding to the vapor-liquid phase equilibrium temperature of the maleic anhydride contained in said gaseous mixture, a second cooling while simultaneously diluting the gaseous mixture with an inert gas taken from the group of gases consisting of nitrogen, carbon dioxide and air, in an amount sufficient to attain a maleic anhydride partial pressure below 3 mm./Hg but above 2.24 mm./Hg, continuing said second cooling until said diluted gaseous mixture attains a temperature close to but above the dew point of the water vapors contained therein to condense maleic anhydride vapors and cause the formation of crystals, and separating crystalline maleic anhydride from the gaseous mixture.

2. The process according to claim 1, wherein said inert gas is atmospheric air.

3. The process according to claim 1, wherein said inert gas is of a temperature sufficient to bring the diluted gaseous mass without further cooling to a temperature close to, but not below, the dew point of the water vapors contained therein.

4. The process according to claim 1, wherein the gaseous mixture, after said first cooling, is subjected to a filtration by an adsorbing material selected from the group consisting of activated charcoal, activated alumina and silica gel.

5. The process ccording to claim 4, wherein the gaseous mixture enters said filter at a temperature ranging from 300 to 200° C., remains in contact with the filter for about 1 to 1½ seconds, and emerges from the filter at a temperature ranging from 200 to 110° C.

6. A process for the direct separation of pure, crystalline maleic anhydride from a gaseous mixture obtained upon partial oxidation of benzene and like organic compounds and consisting of at least 0.5% by volume of maleic anhydride, water vapors of substantially not more than 2.5% by volume and by-products of the oxidation, said process comprising a first cooling of the hot gaseous mixture to a temperature not lower than that corresponding to the vapor-liquid phase equilibrium of the maleic anhydride contained in said gaseous mixture, a second cooling while simultaneously diluting the gaseous mixture with atmospheric air in an amount sufficient to attain a maleic anhydride partial pressure below 3 mm./Hg but above 2.24 mm./Hg and of a temperature sufficiently low for the diluted gaseous mixture to attain a temperature close to but above the dew point of the water vapors contained therein to condense maleic anhydride vapors and cause the formation of crystals, and separating crystalline maleic anhydride from the gaseous mixture at substantially atmospheric pressure.

References Cited in the file of this patent

UNITED STATES PATENTS 2,583,013     Patterson _____ Jan. 22, 1952
2,607,440     Lewis _____ Aug. 19, 1952